(No Model.) 2 Sheets—Sheet 1.
N. E. AUSTIN.
APPARATUS FOR HOISTING AND MANIPULATING BLOCKS OF STONE.
No. 433,669. Patented Aug. 5, 1890.
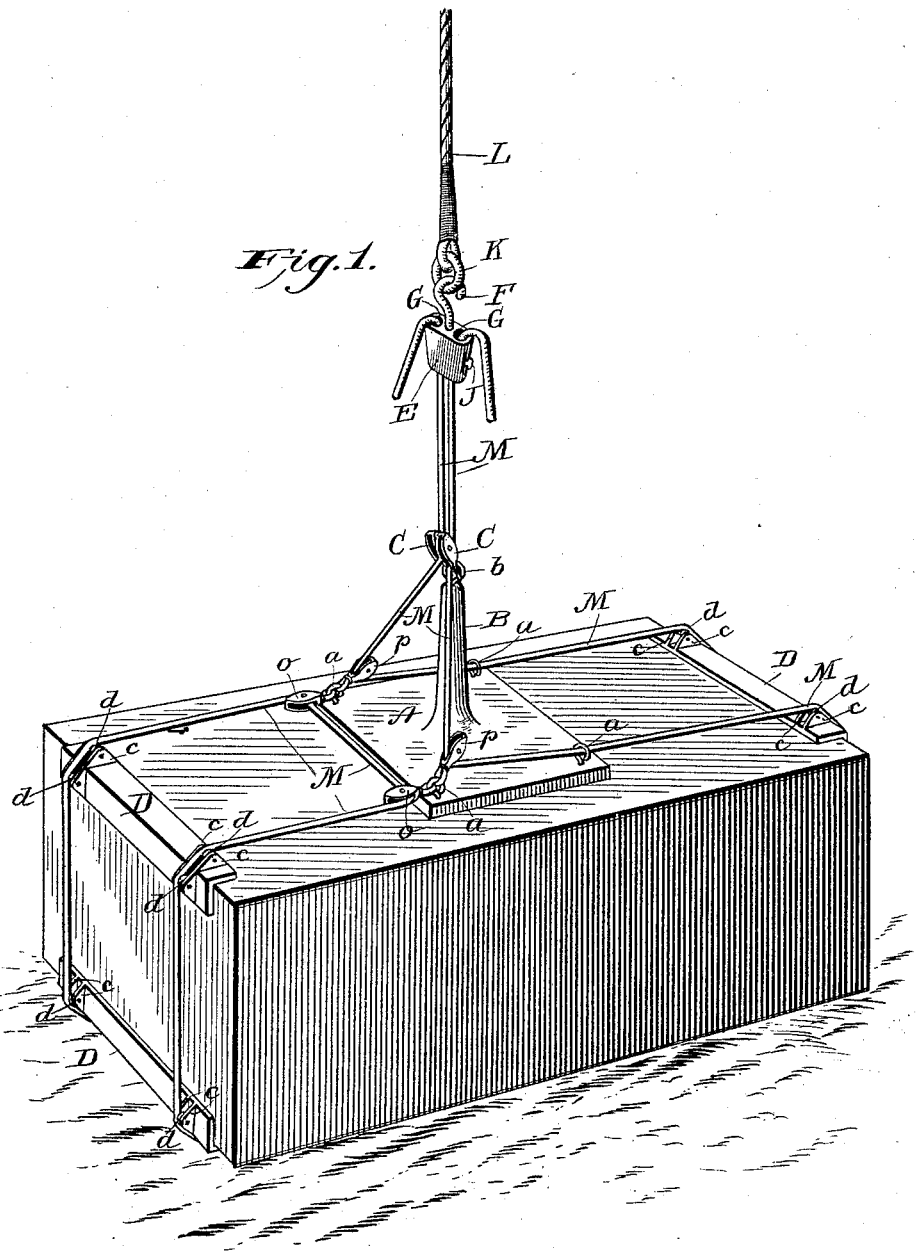
WITNESSES:
INVENTOR
Nelson E. Austin
BY ATT'Y (No Model.) 2 Sheets—Sheet 2.
N. E. AUSTIN.
APPARATUS FOR HOISTING AND MANIPULATING BLOCKS OF STONE.
No. 433,669. Patented Aug. 5, 1890.
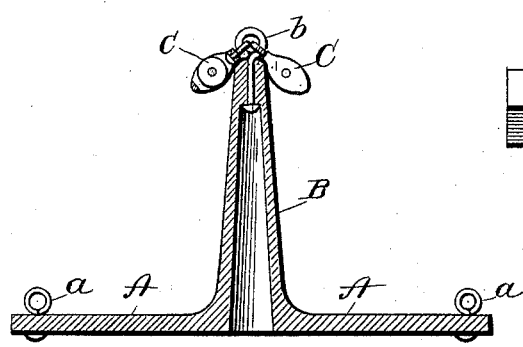
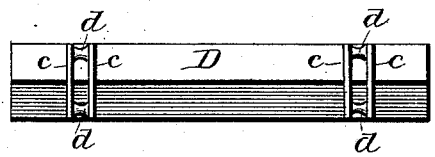
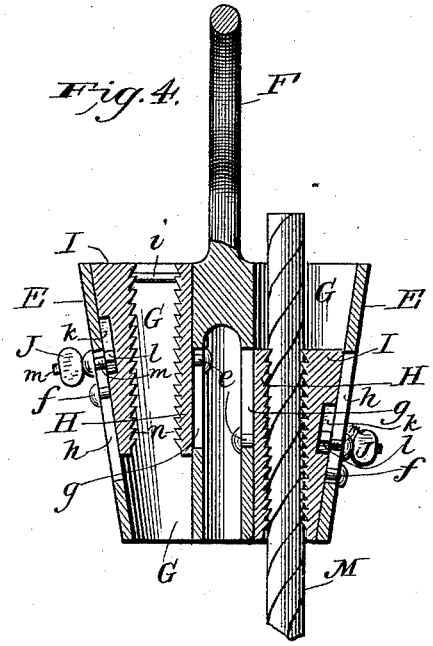
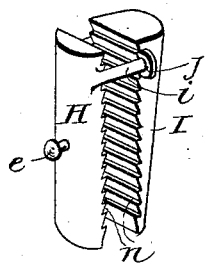
WITNESSES:
J. S. Finch
Chas H. Fleming
INVENTOR
Nelson E. Austin
BY F. W. Smith Jr. ATT'Y

UNITED STATES PATENT OFFICE.

NELSON E. AUSTIN, OF DANBURY, CONNECTICUT.

APPARATUS FOR HOISTING AND MANIPULATING BLOCKS OF STONE.

SPECIFICATION forming part of Letters Patent No. 433,669, dated August 5, 1890.

Application filed January 18, 1890. Serial No. 337,306. (No model.)

*To all whom it may concern:*

Be it known that I, NELSON E. AUSTIN, a citizen of the United States, residing at Danbury, in the county of Fairfield and State of Connecticut, have invented certain new and useful Improvements in Apparatus for Hoisting and Manipulating Blocks of Stone; and I do hereby declare the following to be a full, clear, and exact description of the invention, such as will enable others skilled in the art to which it appertains to make and use the same.

My invention relates to certain new and useful improvements in apparatus for manipulating heavy blocks of stone, and has for its object to provide means whereby a steady strain may be maintained on the rope which sustains the stone, and thereby prevent the latter from suddenly keeling over, as it would do in case the rope were slack, and, furthermore, to do away with the necessity of knotting the rope when the latter is attached to a derrick.

In the accompanying drawings, Figure 1 is a perspective illustrating my invention; Fig. 2, a detail sectional elevation of the head-block; Fig. 3, a detail elevation of an angle-block; Fig. 4, a sectional elevation of the rope-clamp, and Fig. 5 a detail perspective of the jaws of said clamp.

Similar letters denote like parts in the several figures of the drawings.

Prior to my invention it has been the custom among stone-workers in handling heavy stones to cradle the stone with chains or rope and then to knot the latter and attach it to the hoisting apparatus; but great annoyance has always been caused by the slipping of the rope or chain and by the failure of the block of stone to swing squarely; also, in "ending over" heavy stone when the latter had been raised on edge, so that the center of gravity fell beyond said edge, the stone would suddenly flop over with tremendous force, thereby breaking the ropes if the slack therein is fully taken up by the fall of the stone before the latter has touched the ground, and not infrequently chipping and ruining the stone itself. My invention overcomes these difficulties, and will be readily understood from the following description:

A is a head-block, which has a broad plain base and an upright post B. At the corners of this block are swiveled eyes $a$, and within the top of the post is swiveled an eye $b$. Attached to this eye $b$ are two ordinary swivel-pulleys C.

D are angle-blocks, which have on their meeting faces ears $c$, arranged in pairs at each end of said blocks, and $d$ are pulleys journaled between said ears.

The rope-clamp which I use is constructed as follows: E is a casing, preferably cast of malleable iron, with a hook F extending from the top. This casing has two tapered channels G therethrough, within which are pairs of jaws H I, adapted to slide freely. These jaws H I have guide-pins $e\,f$, which extend through elongated slots $g\,h$ in the casing, for the purpose of steadying the movements of said jaws. From the jaws H arms $i$ extend through eyes $j$ in the jaws I for the purpose of insuring concerted action in the sliding of said jaws. Recesses $k$ are formed in the outer walls of the jaws I, and within the recesses are bolt-heads $l$, whose threaded shanks $m$ extend outward through the slots $h$. J are thumb-nuts run on the extremities of said shanks $m$. The object of this last construction is to afford means to bind the head $l$ against the casing E for the purpose of retaining the jaws in any position, as will be hereinafter more fully explained. The inner faces of the jaws are serrated, as shown at $n$, to afford a firm bite on the rope.

In utilizing the clamp the rope ends are thrust through the channels G from the bottom, the jaws readily sliding upward and distending as the rope is inserted between the same. The ropes are pulled through the clamp a short distance, and the hook F is then attached to the eye K of any ordinary hoisting-cable L. It will be readily understood that any upward draft of said cable will cause the jaws of the clamp to be forced down so as to grip the rope firmly, and of course the greater the strain the tighter will the grip become. In manipulating blocks of stone when it is necessary from time to time that the strain on the cable should be slackened, the thumb-nuts J may be tightened after the jaws have firmly gripped the ropes, as seen at Fig. 4, in order that they may not be accidentally backed when the ropes are slack.

My improved apparatus is adjusted around a block of stone as follows: The head-block is placed flat upon one face of the block and the angle-blocks fitted to the edges of said block. Ordinary swivel-pulleys *o p* are hooked to two adjacent eyes *a*, and the rope M is passed through the pulleys *o*, around the stone and over the pulleys *d*, through the two other eyes *a*, and thence through the pulleys *p* and C. The free ends of the rope are now inserted through the clamp and the latter connected to the hoisting-cable, as hereinbefore set forth.

It will be clearly seen that a block of stone cradled with my apparatus can be ended over in any direction without any slacking of the rope after the gravity limit has been passed, as hereinbefore set forth.

The pulleys *o p* may be attached to any two of the eyes *a*, according to the peculiar manipulation of the stone desired; also, in some instances it is advantageous that these pulleys should be connected to each one of the eyes *a*, and I therefore do not wish to be limited in respect to the use of said pulleys.

Having thus fully described my invention, what I claim, and desire to secure by Letters Patent, is—

1. In an apparatus for hoisting and manipulating blocks of stone, a head-block having a broad base provided with swiveled eyes at each corner, and having a post projecting upwardly therefrom provided with a swiveled eye and two swivel-pulleys connected to said eye, substantially as set forth.

2. In an apparatus for hoisting and manipulating blocks of stone, the combination of the head-block having a broad base and a post extending upwardly therefrom, the eyes *a*, swiveled in each corner of said base, the eye *b*, swiveled in the top of said post, the swivel-pulleys C, attached to the post-eye, the swivel-pulleys *o p*, connected to the eyes in said base, the angle-blocks having pulleys journaled therein, and the rope passed around the stone and through said pulleys, substantially as set forth.

3. The combination, with the head-block having a broad base and upwardly-projecting post and provided with swiveled eyes and swivel-pulleys connected therewith, as described, the angle-blocks having pulleys journaled therein, and the rope passed around the stone and through said eyes and pulleys, of the casing E, having hook F extending from the top and provided with two tapering channels therethrough, the clamping-jaws H I within said channels, and means for securing said jaws in any adjustment, substantially as set forth.

4. In an apparatus for hoisting and manipulating blocks of stone, the angle-blocks adapted to fit the edges of the stone and having at each end pairs of ears between which are journaled pulleys, substantially as shown and described.

5. In an apparatus for hoisting and manipulating blocks of stone, a clamp for the free ends of the rope, consisting of a casing E, having tapered channels G therethrough, and elongated slots *g h*, leading within said channels, in combination with the jaws H I, adapted to slide freely within said channels, guide-pins *e f*, extending from said jaws through the slots *g h*, respectively, arms *i* in the jaws H, eyes *j* in the jaws I, within which said arms project, whereby the two jaws are united, recesses *k*, formed in the outer walls of the jaws I, bolt-heads *l* within said recesses, threaded shanks *m*, extending from said bolt-heads through the slots *h*, and thumb-nuts J on the ends of said shanks, substantially as shown, and for the purposes set forth.

In testimony whereof I affix my signature in presence of two witnesses.

NELSON E. AUSTIN.

Witnesses:
FRANK S. KNOX,
JABEZ AMSBURY,